United States Patent
Engle

(10) Patent No.: US 6,866,050 B2
(45) Date of Patent: Mar. 15, 2005

(54) VACCUM TRANSFER SYSTEM AND METHOD FOR FOOD GRADE PRODUCT

(76) Inventor: Marcus J. Engle, 1732 Beltline Rd., Sauk Centre, MN (US) 56378

( * ) Notice: Subject to any disclaimer, the term of this patent is extended or adjusted under 35 U.S.C. 154(b) by 0 days.

(21) Appl. No.: 10/795,708

(22) Filed: Mar. 8, 2004

(65) Prior Publication Data

US 2004/0168713 A1 Sep. 2, 2004

Related U.S. Application Data

(60) Division of application No. 10/162,157, filed on Jun. 3, 2002, now Pat. No. 6,729,338, which is a continuation of application No. 09/528,285, filed on Mar. 17, 2000, now Pat. No. 6,425,408, which is a continuation-in-part of application No. 09/061,408, filed on Apr. 16, 1998, now Pat. No. 6,058,949, which is a continuation-in-part of application No. 08/632,558, filed on Apr. 15, 1996, now Pat. No. 5,839,484
(60) Provisional application No. 60/001,846, filed on Aug. 2, 1995.

(51) Int. Cl.[7] .............................. B08B 9/032; B08B 9/08
(52) U.S. Cl. .................................. 134/169 R; 134/116
(58) Field of Search .............................. 134/169 R, 116, 134/166 R, 168 R, 172, 115 R

(56) References Cited

U.S. PATENT DOCUMENTS 3,916,923 A * 11/1975 Branton .................... 134/57 R
5,147,133 A * 9/1992 White ........................ 366/138
5,589,080 A * 12/1996 Cho et al. .................... 210/791

\* cited by examiner

Primary Examiner—Michael Barr
Assistant Examiner—Saeed Chaudhry
(74) Attorney, Agent, or Firm—Patterson, Thuente, Skaar & Christensen, P.A.

(57) ABSTRACT

A vacuum transfer system for transferring food grade products. A biased ball in a cage with a substantially uninterrupted cage wall is utilized as a check valve. The ball may be biased by a weight to float in a predictable orientation relative to the cage. The biased ball assures that a certain portion of the ball will consistently engage with and aperture. The biased ball also minimizes chattering of the ball in the cage under high flow conditions.

26 Claims, 12 Drawing Sheets

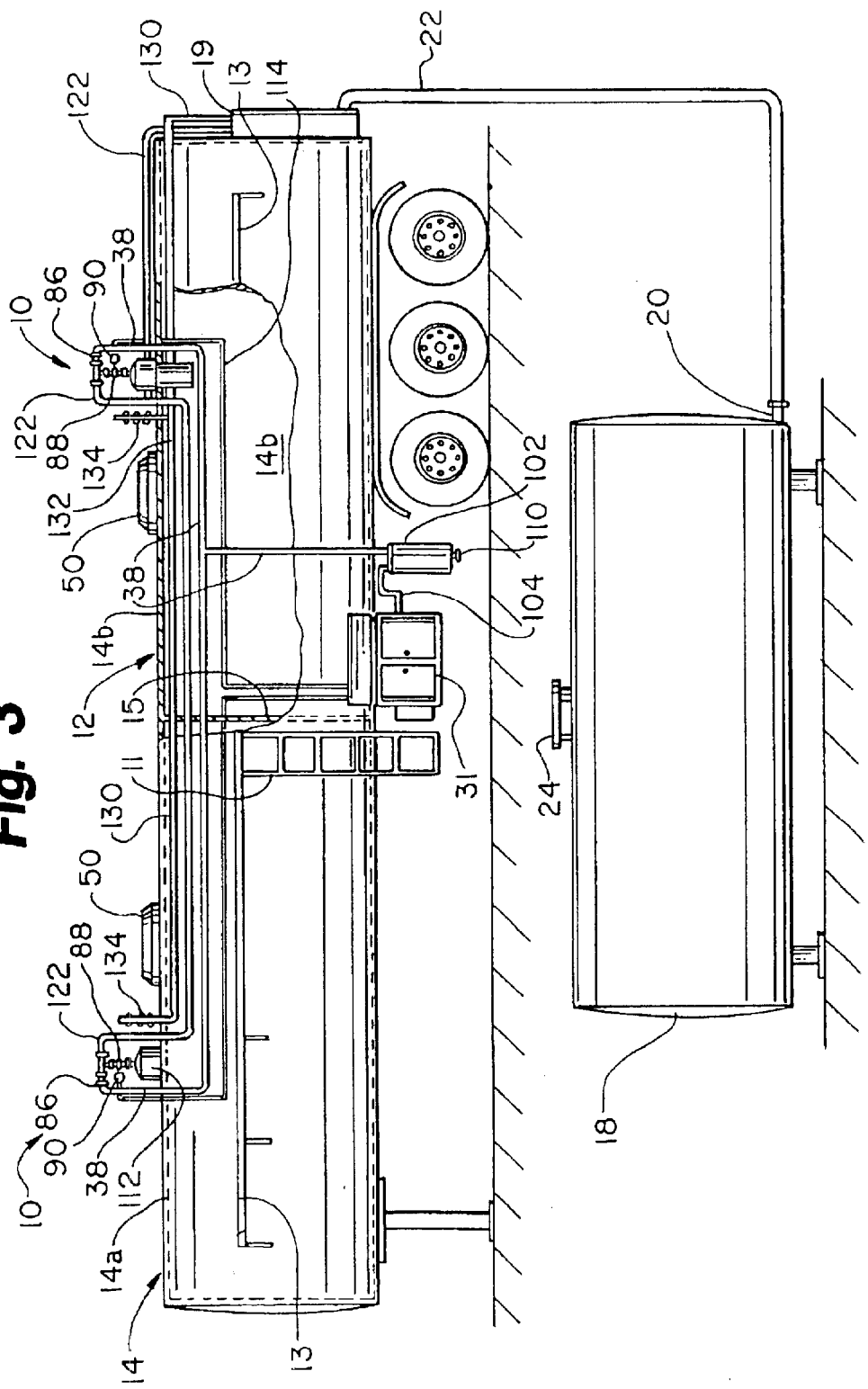

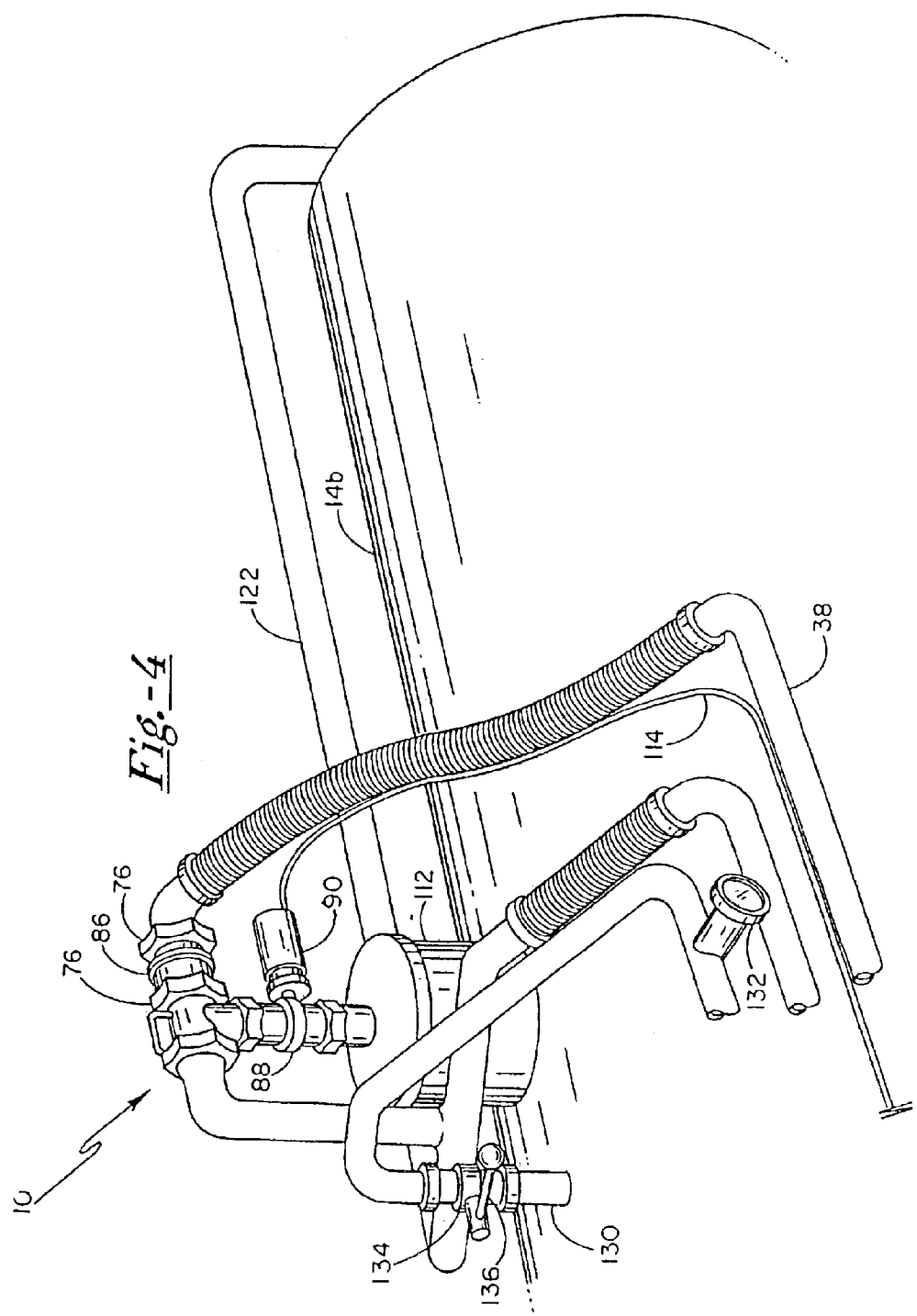

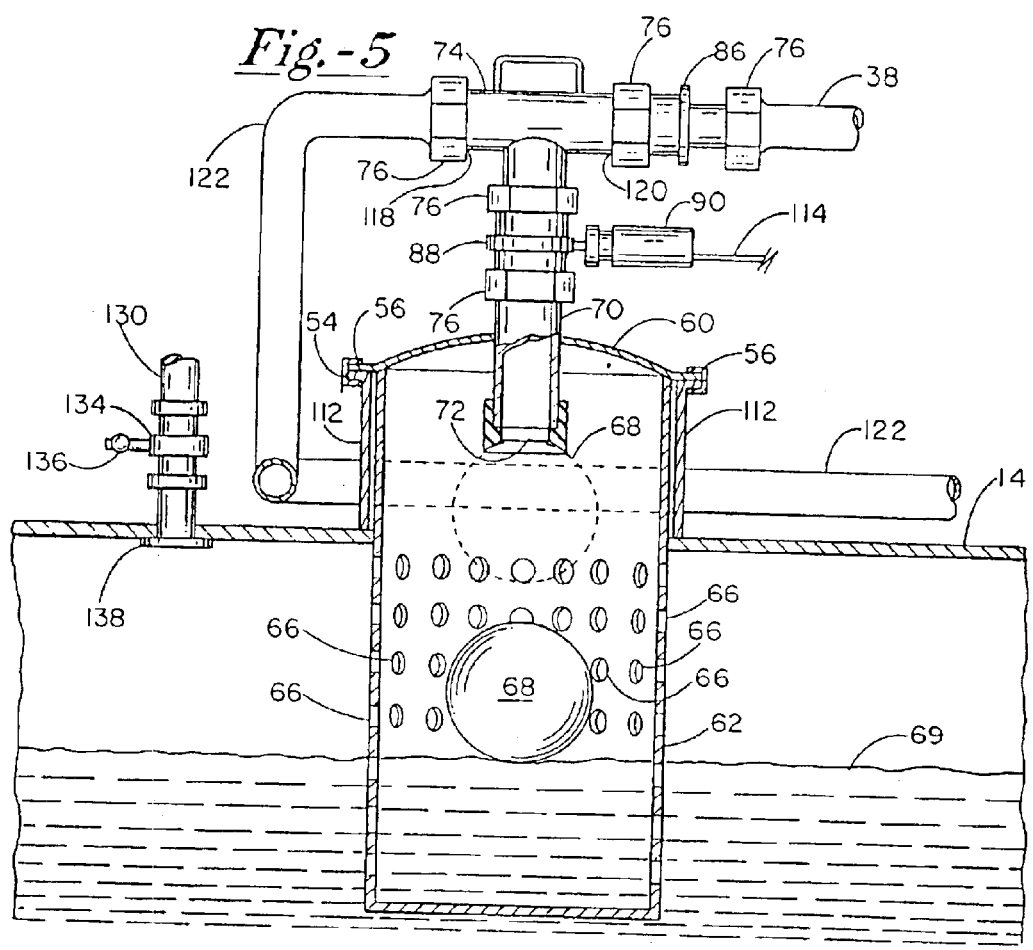
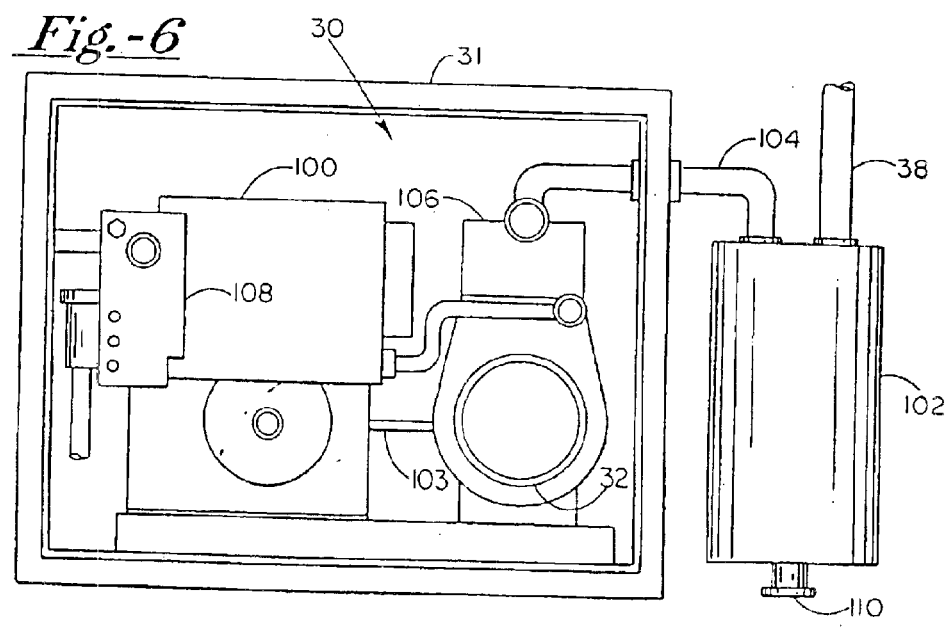

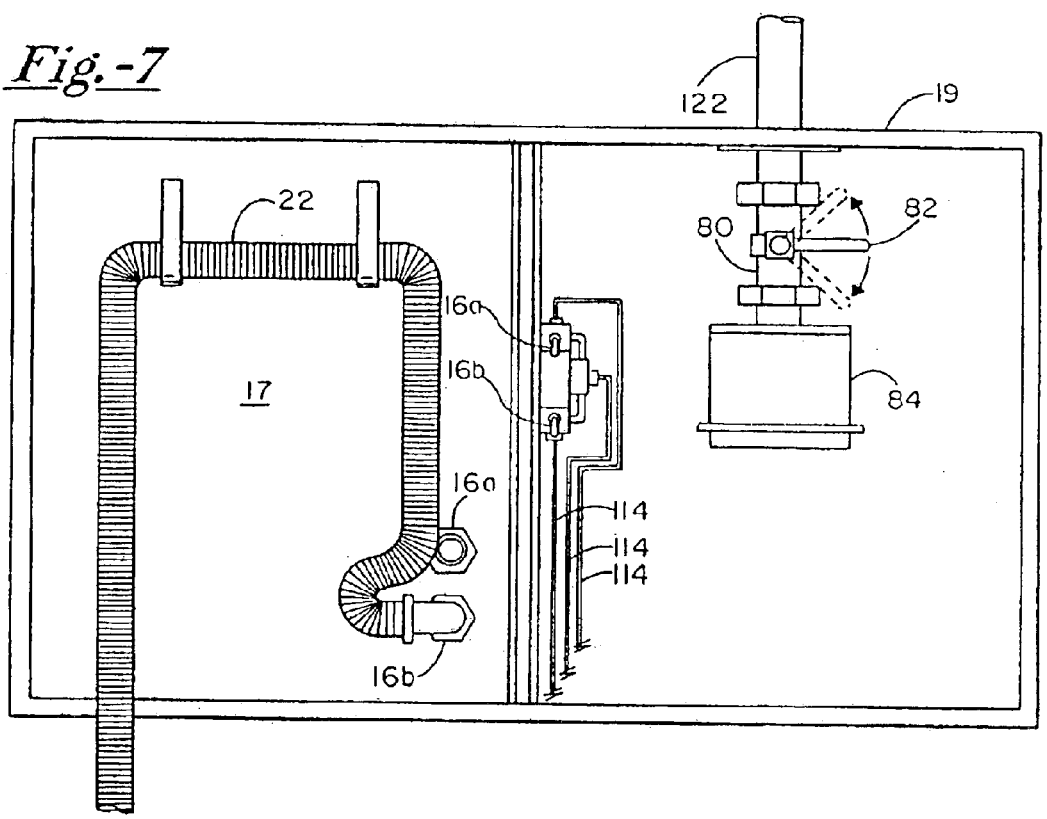

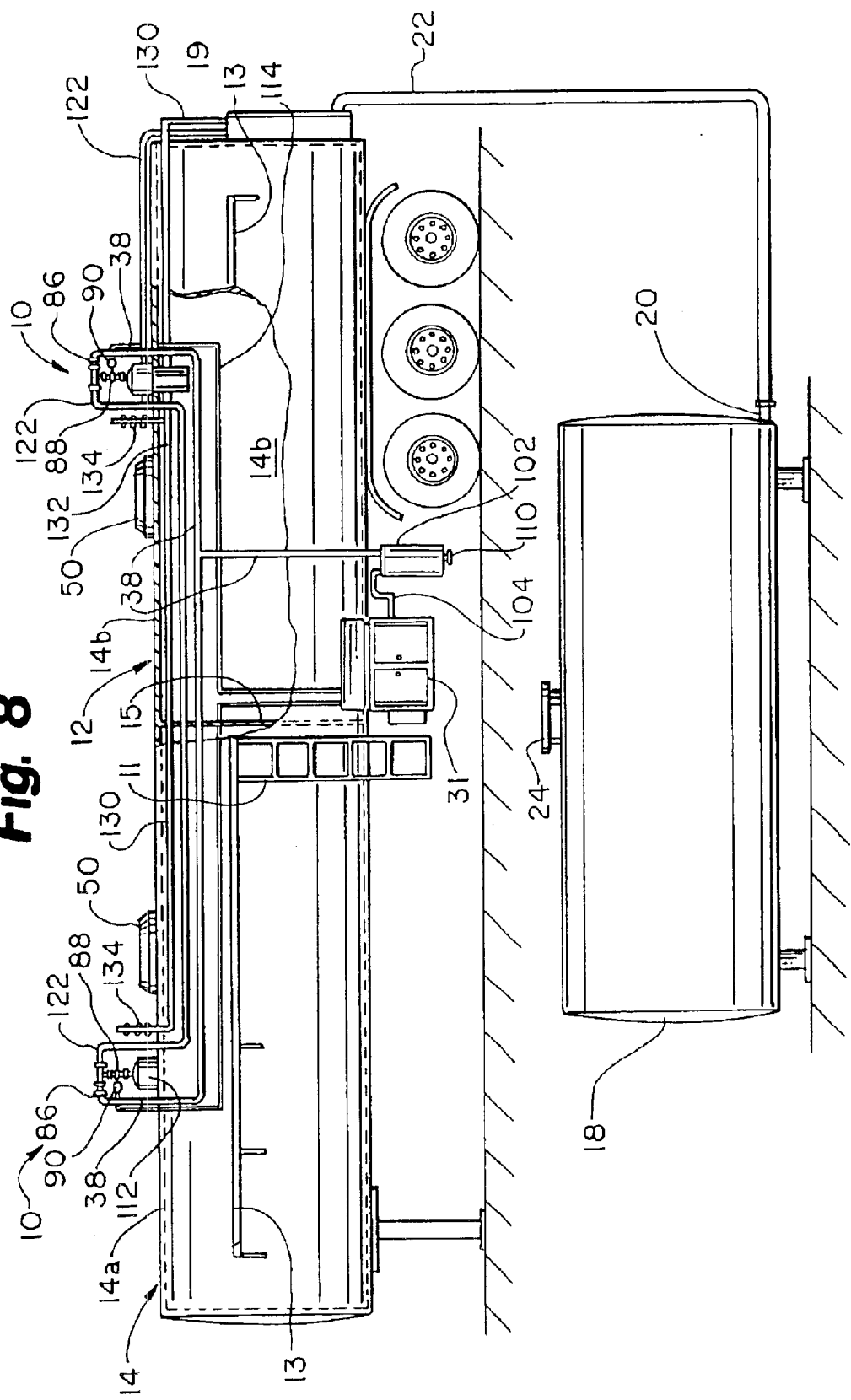

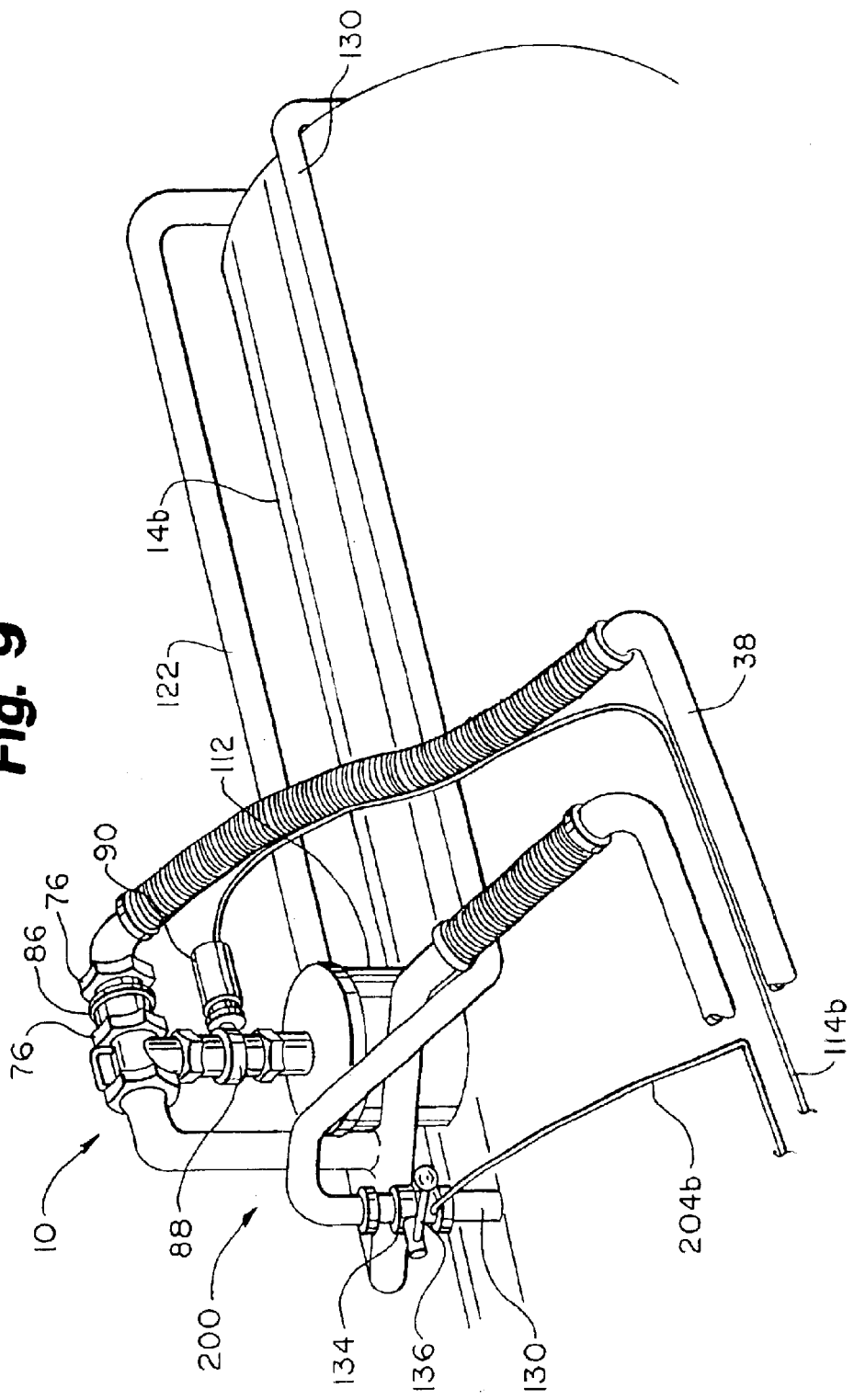

VACCUM TRANSFER SYSTEM AND METHOD FOR FOOD GRADE PRODUCT

RELATED APPLICATIONS

This application is a divisional of U.S. application Ser. No. 10/162,157, filed Jun. 3, 2002 now U.S. Pat. No. 6,729,338, which is a continuation of U.S. application Ser. No. 09/528,285, filed Mar. 17, 2000 now U.S. Pat. No. 6,425,408, which is a continuation-in-part of U.S. application Ser. No. 09/061,408, filed Apr. 16, 1998, now U.S. Pat. No. 6,058,949, issued May 9, 2000, which is a continuation-in-part application of U.S. application Ser. No. 08/632,558, filed Apr. 15, 1996, now U.S. Pat. No. 5,839,484, issued Nov. 24, 1998, which application claims the benefit of U.S. Provisional Application No. 60/001,846, filed Aug. 2, 1995, each of which are hereby incorporated by reference in its entirety.

TECHNICAL FIELD

The present invention relates to the transfer of food grade product in and out of a vessel. More particularly, the transfer is effected by means of vacuum generated in the vessel.

BACKGROUND OF THE PRESENT INVENTION

Food grade product is presently transferred from one vessel to another vessel by means of mechanical pumps that typically have rotating impellers or the like that effect the pumping of the food grade product. Food grade product may include for example eggs, liquid ingredients for the making of ice cream, raw or processed milk, liquid feed for livestock, liquid ingredients for the making of cheese, and the like. Reference herein is with respect to the transfer of raw milk from a holding tank at the production site to a vehicle tank for the transfer of the raw milk to a processing plant. The vehicle may be either a truck or a trailer, as depicted, that is transported by a tractor. Those skilled in the art will recognize that the same principles as are described herein are applicable to other transfers of food grade product from a first vessel to a second vessel. For example, the transfer of raw milk from the truck or trailer-mounted tank to a tank in the processing plant may be effected by the present invention. Additionally, the transfer of food grade product from a first vessel in the processing plant to a second vessel in the processing plant may be effected by the present invention.

Bulk milk pick-up from the point of origin as we know it today, consists of a truck or trailer-mounted stainless steel insulated transport tank. This transport tank is at atmospheric pressure and is therefore not operated at a vacuum and not operated at a pressure greater than atmospheric pressure. In order to effect the transfer of the raw milk form the holding tank to the transport tank, both the holding tank and the transport tank are vented to the atmosphere during the transfer operations.

The amount of time spent transferring the raw milk or other food grade product is a major cost item. With respect to the transport of raw milk, this time dictates the number of drivers and transport trucks needed to service a specified route of customers. The size of dairies has been ever increasing and the distance between dairies on a route is also increasing. Dairy herds of more than two hundred animals are not considered big any more. This increase in size has required that the size of the holding tanks at the dairy be greatly increased. In the past, a five hundred gallon holding tank was considered adequate. The holding tank now may hold several thousand gallons of raw milk. The sheer size of the holding tanks has greatly increased the transfer times. During the transfer of the milk from the holding tank to the transport tank both the driver and the truck are idle, greatly increasing the cost of transporting the milk from the dairy top the processing plant.

The milk is presently pumped from the holding tank at the farm (or other site of pick-up) to the transport tank by several different types of mechanical food grade impeller pumps. Presently, the pump that will pump the greatest volume of milk is a hydraulic driven stainless steel gear pump that will pump 230 gallons per minute. The cost of this unit is approximately $15,000.00 installed. To transfer two thousand gallons of milk product using this pump takes in excess of eight minutes.

The problem to the purchaser of the aforementioned pump, aside from the cost, is a problem that is years old. Every time milk is forced through pump impellers, the bacteria count in the milk is multiplied, and the molecular structure of the raw milk product is broken down. The more agitation that is caused by the pump, the greater the increase in the bacteria level and the greater the molecular breakdown that results in the milk. The increase in the bacteria level can pose a serious health concern. Additionally, the membrane around the fat molecule is broken by the pump agitation, resulting in undesired acidity in the milk. The molecular breakdown results in a decrease in the amount of the milk that can be used as an ingredient in dairy products, such as ice cream and cheese. The non useable portion is disposed of as the whey that is a by product of making the dairy products and is useful primarily for animal feed. The animal feed is sold at substantially reduced cost as compared to products for human consumption that could otherwise have been produced, thereby reducing the potential return from a quantity of raw milk.

An additional health concern is the cleanliness of the pump used for the transfer of the food grade product from vessel to vessel. Recently, an incident of salmonella infection being passed on to the ultimate consumer as a result of the lack of cleanliness of the transport vessel has been reported. It is a requirement that the transfer pumps be disassembled at least daily and sanitized to preclude such a problem from occurring. Sanitizing the impellers of the pump is a difficult task. Only a small amount of the salmonella organism left in the impeller can taint a subsequent load of food grade product that is pumped into the vessel.

With the increased size of dairy holding tanks comes the need to increase the volume load of the transport tanks that are mounted on a single truck chassis. Many states have stringent regulations governing the gross weight of vehicles using the public roads. With the increased transport tank volume and the weight of milk product that is being transported, there is a need to keep the transport tank weight to a minimum in order to maximize the milk volume that may be legally transported.

It would be a decided advantage in the food products industry to be able to more rapidly transfer food grade product from one vessel to another and at the same time minimize the mechanical agitation of the food grade product that results from such transfer to minimize the bacteria count increase in the food grade product and to minimize the molecular structure breakdown that also results form the mechanical agitation. Further, it would be an advantage to have a transfer system for food grade product that was more easily sanitized.

SUMMARY OF THE INVENTION

Using the vacuum system of the present invention for transferring raw milk, the milk flows at a rate in excess of 2,000 gallons per minute through a six inch diameter conduit while transferring milk from the holding tank and loading the transport tank, thereby reducing the loading time at the pick-up point by a factor of almost ten as compared to the fastest current means. This is accomplished using existing piping from the holding tank to the transport tank. Such piping is typically either two and a half inch pipe or three inch pipe. Coupled with the faster transfer time are a better load environment for the raw product, a significant lowering of the initial costs of the pumping system, and a reduction in clean-up and re-sanitizing time of the system as the raw product never touches any pumping mechanism, but is transferred solely through piping. No additional pump is necessary to effect the transfer of the food grade product. Additionally, from a health standpoint, there is no deleterious agitation of the food grade product heretofore associated with pumping by means of high speed impeller rotation. Further, the present invention includes a cleaning and sanitization system for cleaning and sanitizing both the tanks and the vacuum lines.

The present invention includes a cleaning apparatus for cleaning and sanitizing a tank, the tank for holding liquid food grade product, the liquid food grade product being transferred into and out of the tank by means of vacuum, the tank having a vacuum transfer system for transferring liquid food grade product includes apparatus for cyclically alternating a flow of cleaning fluid between the tank and the vacuum transfer system. The present invention is further, a method for cleaning and sanitizing a tank for holding liquid food grade product, the liquid food grade product being transferred into and out of the tank by means of vacuum, the tank having a vacuum transfer system for transferring liquid food grade product. The method includes the steps of:

(a) providing a cleaning fluid to a fluid inlet;

(b) cyclically alternating the flow of cleaning fluid between the tank and the vacuum transfer system; and (c) venting the cleaning fluid from the tank and from vacuum transfer system;

whereby the tank and the vacuum transfer system are cleaned and sanitized during a single cleaning program having a selected series of rinse, cleaning and sanitizing cycles.

BRIEF DESCRIPTION OF THE DRAWINGS

FIG. 3 is a side view of a tank vehicle with tandem transport tanks mounted thereon and a second embodiment of the vacuum transfer unit of the present invention mounted in each of the transport tanks with a portion of one tank broken away to reveal the vacuum unit mounted therein;

FIG. 4 is perspective view of the plumbing and valving of the rearmost vacuum transfer unit as depicted in FIG. 3;

FIG. 5 is an elevational view of the vacuum transfer unit with portions thereof broken away;

FIG. 6 is an elevational view of the vacuum generation unit mounted on the tank vehicle;

FIG. 7 is an elevational view of the interior of the rear compartment of the tank vehicle;

FIG. 8 is a side view of a tank vehicle with tandem transport tanks mounted thereon and a vacuum transfer unit of the present invention mounted in each of the transport tanks with a portion of one tank broken away to reveal the vacuum unit mounted therein;

FIG. 9 is perspective view of the plumbing and valving of the rearmost vacuum transfer unit as depicted in FIG. 8;

DETAILED DESCRIPTION OF THE DRAWINGS

Figure 1:
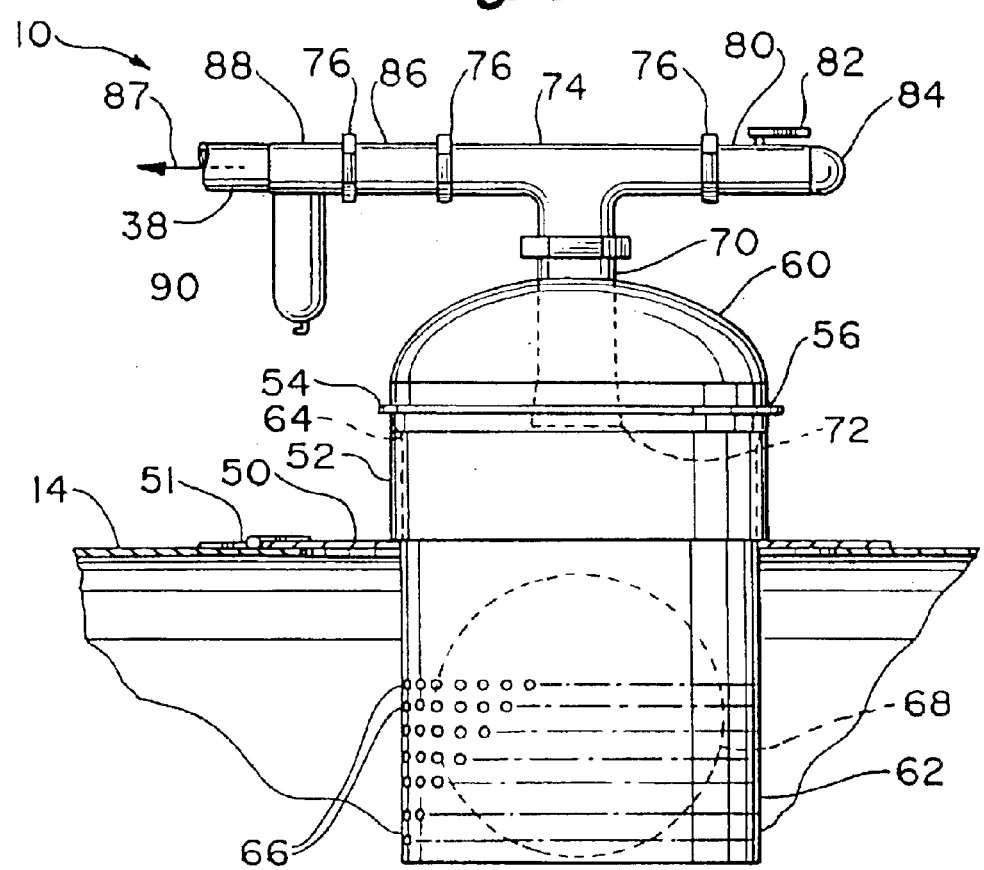
FIG. 1 is a sectional side view of the vacuum transfer unit of the present invention as taken along lines 1—1 of FIG. 2.
Figure 2:
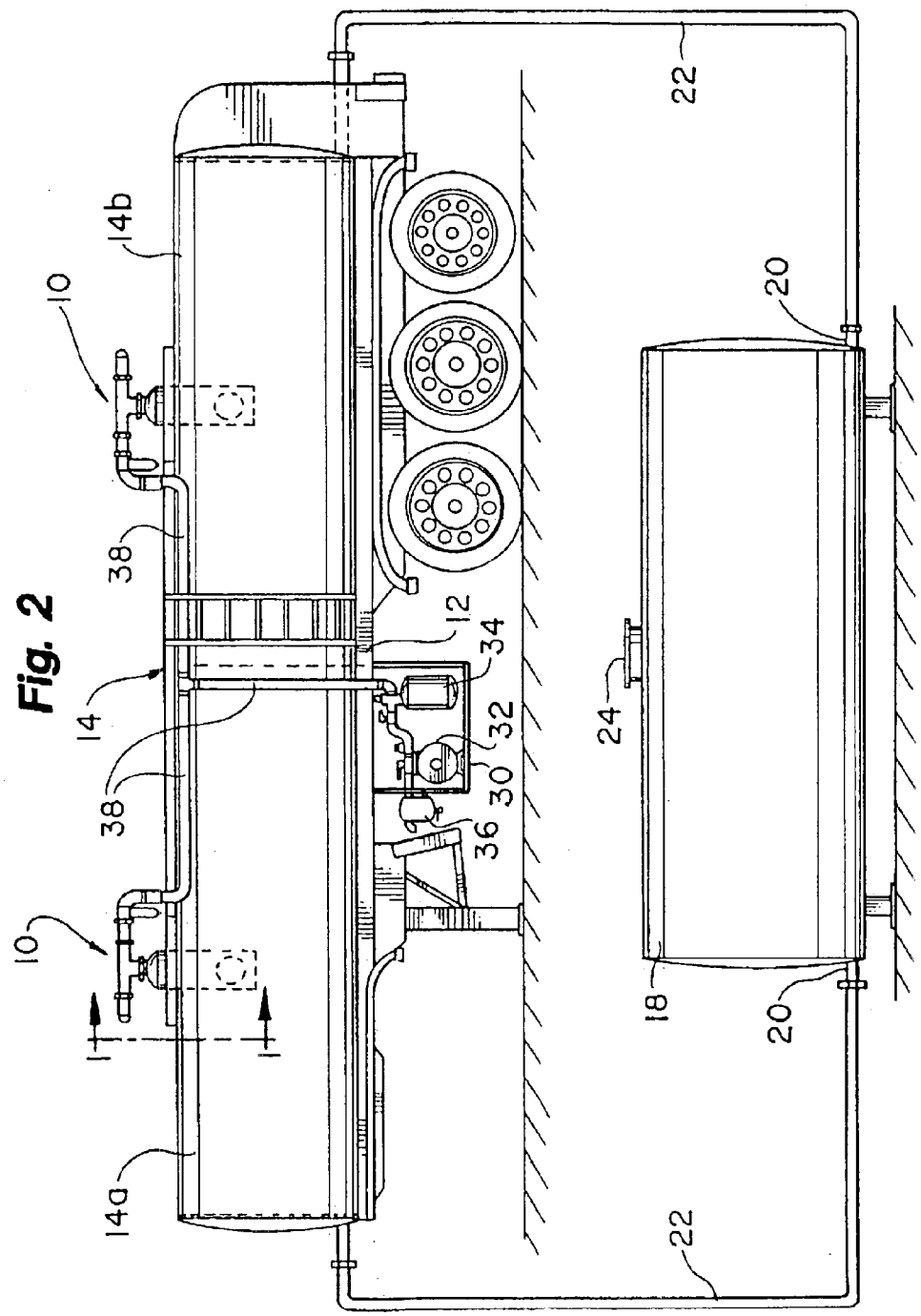
FIG. 2 is a side view of a vehicle with tandem transport tanks mounted thereon and a primary shutoff unit mounted in each of the transport tanks.

The vacuum transfer unit of a first embodiment of the present invention is shown generally at 10 in FIGS. 1 and 2. A tank vehicle 12 has a unitary transport tank 14 mounted thereon. In the depiction of FIG. 2, the transport tank 14 is divided into two separate tanks 14a, 14b. A single tank 14 configuration could be used as well. Although the present invention is described with respect to a transport tank, the vacuum transfer unit 10 is useful for effecting transfer into and from any vessel.

The transport tank 14 is preferably constructed of 10 gauge stainless steel, (the same material and thickness as some non-vacuum tanks of today) and is reinforced with stainless steel hat channel rings and deep dish heads to keep the tank 14 from implosion during periods of high vacuum in the tank 14. The cross section of the hat channels is substantially similar to the cross section of a hat having a crown and circular brim. Insulation is placed between the channels and a preferably stainless steel outer shell is affixed to the outer margin of the channels.

Each transport tank 14a, 14b has a product inlet/outlet 16a, 16b associated therewith. The product inlet/outlet 16a, 16b is typically disposed at a low point in the transport tank 14a, 14b so that the transport tank 14a, 14b is filled from the bottom thereof and emptied from the bottom thereof. As depicted, a holding tank 18 is positioned adjacent to the tank vehicle 12. The holding tank 18 has two outlets 20. Each such outlet 20 is fluidly coupled to one of the product inlet/outlets 16a, 16b by a flexible conduit 22. The flexible conduit 22 is typically stored on the tank vehicle 12 and connected to the holding tank 18 at the product pickup site. The flexible conduit 22 may have a diameter between two and a half inches and six inches. The holding tank 18 has a inlet/vent 24 through which food product is transferred into the holding tank 18 and by which means the holding tank 18 is vented during removal of food product therefrom.

A vacuum generation unit 30 is mounted on the tank vehicle 12. The vacuum generation unit 30 may be power take off (PTO) driven from the tractor (not shown) that is utilized to pull the tank vehicle 12. The vacuum generation unit 30 is comprised of a pump 32, a filter 34, a lubricant trap 36, and vacuum lines 38. The pump 32 is preferably a vane type pump. The filter 34 isolates the pump 32 from any foreign material, including product, that may be passing through the vacuum lines 38. A lubricant is typically injected into the pump to lubricate the interfaces between the vanes (not shown) and the inner surface (not shown) of the pump case of pump 32. The lubricant trap 36 is downstream of the pump 32 and is utilized to entrain lubricant that is carried with the exhaust from the pump 32. The lubricant so entrained may be then recycled back to the pump 32 to further lubricate the vanes thereof.

Referring to FIG. 1, a manway cover 50 is hinged at one side 51 and sealed at the perimeter thereof to the outer surface of the tank 14. The manway cover 50 is generally circular and is contoured to conform to the surface of the outer shell of the tank 14. The manway cover is preferably constructed of stainless steel.

A manway opening 52 is centrally disposed in the manway cover 50. The manway opening 52 is preferably cylindrical in shape, having a lower margin that is shaped to conform to the contour of the manway cover 50. The upper margin of the manway opening 52 has a sealing lip 54 defined thereon. The manway opening 52 is preferably a circular opening having a diameter of approximately two feet to make it possible for a person to enter the tank 14 through the manway opening 52, if needed.

The vacuum transfer unit 10 is depicted as being inserted from the top within the manway opening 52. The vacuum transfer unit 10 is sealingly retained within the manway opening 52 by quick release clamp 56 affixed to the sealing lip 54. The quick release clamp 56 is preferably a circular ring that encloses the sealing lip 54 and is held in sealing engagement therewith by an over center lock (not shown). The vacuum transfer unit 10 may be readily removed from the manway opening 52 in order to perform required cleaning and sanitizing by releasing the quick release clamp 56 and pulling the vacuum transfer unit 10 upward, clear of the manway opening 52.

Vacuum transfer unit 10 is fully constructed of stainless steel material in order to meet the requirements for storing and transferring food grade product.

Vacuum transfer unit 10 has a low profile vacuum transfer dome 60 that forms the upper surface thereof. A float ball cage 62 depends from the vacuum transfer dome 60 and is attached thereto by float ball cage fastening clips 64. The float ball cage 62 has a plurality of apertures 66 defined therein that permit the free flow of food product in and out of the float ball cage 62, while retaining the stainless steel float ball 68 therein. The float ball 68 is generally spherical in shape and is sealed having a quantity of air trapped therein, such that the float ball 68 will float on top of the liquid food grade product that rises into the float ball cage 62. When there is no liquid food grade product in the float ball cage 62, the float ball 68 drops to the bottom of the float ball cage 62 and rests there.

A primary pipe 70 is disposed within the vacuum transfer dome 60 and provides a fluid passageway through vacuum transfer dome 60 from the float ball cage 62. The lower margin of the primary pipe 70 has a generally circular beveled rubber float seal seat 72 disposed thereon. The float seal seat 72 is beveled inward, such that the lower most diameter of the beveled portion is greater than the uppermost, inner diameter of the beveled portion, as depicted in FIG. 1. The lowermost diameter of the float seal seat 72 is less than the diameter of the float ball 68. The float seal seat 72 is designed to establish a fluidly sealing engagement with the outer surface of the float ball 68 when the float ball 68 has risen into the float seal seat 72 and is centered thereon. The upper margin of the primary pipe 70 is coupled to a stainless steel tee 74 by a stainless steel nut 76.

A first outlet of tee 74 is coupled to a manually operated butterfly valve 80 by a stainless steel nut 76. An external handle 82 is provided on the butterfly valve 80 to manually open and close the butterfly valve 80 as desired. A removable, disposable intake air filter 84 is attached to the butterfly valve 80. The butterfly valve 80 connects the interior of the tank 14 with the outside atmosphere when the butterfly valve 80 is in the open configuration. The butterfly valve 80 could be replaced with another type of U.S.D.A. approved valve, such as a ball type or plug type valve.

The second branch of the tee 74 is coupled by a stainless steel nut 76 to a one way check valve 86. The check valve 86 is biased in the closed configuration so that no fluid flow is possible through the check valve 86. When in the open configuration, the check valve 86 permits the flow of fluid only from right to left as depicted by arrow 87 in FIG. 1. In order to open check valve 86, a vacuum of less than ten inches of mercury, but preferably three to five inches of mercury must be applied at the left side of check valve 86, as depicted in FIG. 1. The necessary vacuum to open the check valve 86 is applied to the left side of the check valve 86 by the vacuum generation unit 30 when the vacuum generation unit 30 is in operation. In all cases when the vacuum generation unit 30 is not in operation, the check valve 86 is biased in the closed configuration, isolating the vacuum line 38 from the tank 14.

Check valve 86 is fluidly coupled by a stainless steel nut 76 to a backup butterfly valve 88. Butterfly valve 88 is coupled to actuator 90. Actuator 90 may be either electrically or pneumatically actuated. Actuation of actuator 90 is preferably synchronized with the activation of the vacuum generation unit 30, such that the butterfly valve 88 is open when the vacuum generation unit 30 is operating and the butterfly valve 88 is closed when the vacuum generation unit 30 is not operating. The butterfly valve 88 is fluidly coupled to vacuum line 38 and thereby to the vacuum generation unit 30.

Upon activation, the vacuum generation unit 30 draws a vacuum in the vacuum lines 38. Such vacuum may selectively affect either or both of the vacuum transfer units 10, as depicted in FIG. 2, depending on the configuration of the aforementioned valves of the two vacuum transfer units 10.

The vacuum transfer unit of a second embodiment of the present invention is shown generally at 10 in FIGS. 3–7. Similar numerals depict similar components in the description of the second embodiment as in the description of the first embodiment of the vacuum transfer unit 10.

A tank vehicle 12 has a unitary transport tank 14 mounted thereon. To facilitate the maintenance and cleaning of the vacuum transfer unit 10 and the tank 14, a ladder 11 and a gangway 13 are provided to afford access thereto by an operator as needed. In the depiction of FIG. 2, the transport tank 14 is divided into two separate tanks 14a, 14b by a wall 15. A single tank 14 configuration could be used as well. Each transport tank 14a, 14b has a product inlet/outlet 16a, 16b disposed on the front wall 17 of the rear compartment 19 of the tank vehicle 12, as depicted in FIG. 7. A flexible conduit 22 is stored in the rear compartment 19 for connecting to the holding tank 18.

Referring to FIG. 3, a manway cover 50 is fluidly coupled to each tank 14a, 14b. Each manway cover 50 is hinged at one side and sealed at the perimeter thereof to the outer surface of the tank 14. The manway cover 50 is generally circular and is contoured to conform to the surface of the outer shell of the tank 14. The manway cover 50 is preferably constructed of stainless steel and is designed to accommodate access to the tank 14 by an operator, primarily to clean the inside of the tank 14.

A vacuum generation unit 30 is mounted on the tank vehicle 12 in a cabinet 31. The vacuum generation unit 30 is self contained, in that it contains its own power generation capability and the vacuum generation unit 30 may be configured to either load product into the tank 14 or unload product from the tank 14. This capability ensures that there is an on board capability to load and unload using the components of the present invention, without resort to an external source of power for either loading or unloading the tanks 14a, 14b. This is an important feature so that the tanks 14a, 14b can be loaded or unloaded at any facility without the need for specialized pumping capability at the facility adapted to be compatible with the vacuum transfer unit 10.

The vacuum generation unit 30 is comprised of a pump 32, a motor 100, a secondary shutoff 102, and vacuum lines 38. The pump 32 is preferably a lobe type blower or a rotary vane type air compressor. The pump 32 is powered by a rotary drive shaft 103 coupled to the motor 100. The pump 32 has an air line 104 that fluidly couples the pump 32 to the secondary shutoff 102. A four way change over valve 106 is disposed between the air line 104 and the pump 32 and is mounted on the pump 32. The four way change over valve 106 is utilized to selectively alter the fluid coupling from the pump 32 to the air line 104 such that a vacuum is drawn through the air line 104 or a fluid, preferably air, is forced under pressure through the air line 104. The configuration of the four way change over valve 106 is selectable by an operator utilizing a two position valve handle (not shown). By this means, the pump 32 is used to either draw a negative pressure in the vacuum line 38 or to charge the vacuum line 38 under a positive pressure. Four way change over valve.

The motor 100 is preferably a gas internal combustion engine of approximately eighteen bhp. The motor 100 preferably has a battery and electric start capability that is selectable on an operator's panel 108. The operator's panel 108 also has a throttle for control of the output of the motor 100 as desired. The motor 100 is designed to operate at an idle rpm. When at idle rpm, the motor 100 is disengaged from the pump 32. The throttle can then be advanced to a greater rpm that activates a clutch engagement to the pump 32 and causes rotational driving of the pump 32 by the motor 100.

The secondary shutoff 102 is a vessel that functions as a shutoff to isolate the pump 32 from any liquid that might be drawn from the secondary shutoff 102 through the air line 104. The primary shutoff function is accomplished with the vacuum transfer unit 10. Accordingly, the secondary shutoff 102 has a float valve (not shown) disposed in the secondary shutoff 102 that is interposed between the vacuum line 38 and the air line 104 such that, when the liquid in the secondary shutoff 102 rises to a certain level in the secondary shutoff 102, the float valve engages a seat and the flow of fluid to the pump 32 is interrupted. This prevents liquid from entering the pump 32, which could result in damage to the pump 32. A drain is disposed in the bottom of the secondary shutoff 102 to remove accumulated liquid. The secondary shutoff 102 has a valved drain 110 disposed in the bottom for the draining of liquid therefrom as desired.

Referring to FIGS. 3–5, the vacuum transfer unit 10 is depicted as being inserted from the top within a collar 112. The collar 112 is affixed to the tank 14 as by welding. The vacuum transfer unit 10 is sealingly retained within the collar 112 by quick release clamp 56 removably affixed thereto. The quick release clamp 56 is preferably a circular ring that encloses a lip 54 that forms the upper margin of the collar 112 and is held in sealing engagement therewith by an over center lock (not shown). The vacuum transfer unit 10 may be readily removed from the manway opening 52 in order to perform required cleaning and sanitizing by releasing the quick release clamp 56 and pulling the vacuum transfer unit 10 upward, clear of the collar 112.

The vacuum transfer unit 10 has a low profile vacuum transfer dome 60 that forms the upper surface thereof. A float ball cage 62 depends from the vacuum transfer dome 60. The float ball cage 62 has a plurality of apertures 66 defined therein that permit the free flow of food product in and out of the float ball cage 62, while retaining the stainless steel float ball 68 therein.

A primary pipe 70 is disposed within the vacuum transfer dome 60 and provides a fluid passageway through vacuum transfer dome 60 from the float ball cage 62. The lower margin of the primary pipe 70 has a generally circular beveled rubber float seal seat 72 disposed thereon.

The upper margin of the primary pipe 70 is coupled by a stainless steel nut 76 to a butterfly valve 88. The butterfly valve 88 is coupled to actuator 90. Actuator 90 may be either electrically or pneumatically actuated and acts to open and close the butterfly valve 88. Actuation of actuator 90 is preferably synchronized with the activation of the vacuum generation unit 30 and is controlled by means of communication lines 114 by manually operated switches 116a, 116b, with the switch 116a being coupled to the actuator 90 on the vacuum transfer unit 10 in the tank 14a and the switch 116b being coupled to the actuator 90 on the vacuum transfer unit 10 in the tank 14b. The communication lines 114 are preferably either electric or pneumatic. The butterfly valve 88 coupled to the tee 74 by a nut 76.

The tee 74 has a vent outlet 118 and a vacuum outlet 120. The vent outlet 118 is connected to the vent line 122 by a nut 76. The vent line 122 is coupled to a manually operated butterfly valve 80, as depicted in FIG. 7. An external handle 82 is provided on the butterfly valve 80 to manually open and close the butterfly valve 80 as desired. The butterfly valve 80 is connected to a removable, disposable intake air filter 84 that is located in the rear compartment 19. The butterfly valve 80 connects the interior of the tank 14 with the outside atmosphere when the butterfly valve 80 is in the open configuration.

The second branch of the tee 74 is coupled by a stainless steel nut 76 to a check valve 86. The check valve 86 is biased in the closed configuration so that no fluid flow is possible through the check valve 86. When in the open configuration, the check valve 86 permits the flow of fluid only from right to left as depicted by arrow 87 in FIG. 1. In order to open check valve 86, a vacuum of less than ten inches of mercury, but preferably three to five inches of mercury must be applied at the left side of check valve 86. The necessary vacuum to open the check valve 86 is applied to the left side of the check valve 86 by the vacuum generation unit 30 when the vacuum generation unit 30 is in operation.

Cleaning lines 130 are fixedly coupled to the tank 14. An inlet 132 is depicted in FIG. 4. The inlet 132 provides a coupling to an exterior source of cleaning solution that may be introduced under pressure to the tank 14. A valve 136 that is manually operated by handle 136 is disposed in the cleaning lines 130 so that the cleaning solution may be introduced to either or both of the tanks 14a, 14b, as desired. A spray-ball type nozzle 138 is coupled to the cleaning lines 130 and is disposed within the tank 14 for dispensing the cleaning solution in order to flush the tank 14.

Upon activation, the vacuum generation unit 30 draws a vacuum in the vacuum lines 38. Such vacuum may selectively affect either or both of the vacuum transfer units 10 as depicted in FIGS. 2 and 3 by selectively configuring appropriate valves in the vacuum lines 38.

There are essentially three operating conditions for the present invention. Referring to the embodiment of FIGS. 1 and 2, the first such operating condition is transferring food product from the holding tank 18 into the transport tank 14a, 14b. To effect such transfer by means of vacuum, (a) the tank into which the food grade product is to be transferred, transport tank 14a, 14b in the present example, must be isolated from the atmosphere, (b) the two tanks must be fluidly connected, as by conduit 22 in the present example, and (c) the tank being transferred from, here holding tank 18, must be vented to the atmosphere as at inlet/vent 24. This creates a fluid flow path from the vacuum generation unit 30 through the tanks 14a, 14b, and holding tank 18 to the atmosphere at inlet/vent 24 with the food grade product disposed between the source of the vacuum and the atmosphere. Generation of the vacuum by vacuum generation unit 30 will draw the food grade product toward the source of the vacuum and displace the food grade product in the holding tank 18 with air drawn in through the inlet/vent 24.

In order to establish the requisite fluid flow path as indicated above to effect such transfer, the vacuum transfer unit 10 is configured with the manually operated butterfly valve 80 maintained in its closed position. This isolates the tank 14 from the atmosphere. The vacuum generation unit 30 is activated and at the same time a signal is sent to valve actuator 90 to open the butterfly valve 88. When the butterfly valve 88 is in the open configuration, the check valve 86 is in flow communication with the vacuum generation unit 30 and vacuum generated by the vacuum generation unit 30 acts upon the check valve 88. At such time as the vacuum generation unit 30 applies a three to five inch of mercury vacuum to the check valve 86, check valve 86 opens.

With respect to the embodiment of FIGS. 3–7, the manually operated butterfly valve 80, which is located in the rear compartment 19, is maintained in its closed position. The appropriate switch 116a, 116b, also located in the rear compartment 19, is selected to actuate valve actuator 90 to open the butterfly valve 88 for the desired tank 14a or 14b. Prior to energizing the pump 32, the four way change over valve 106 must be in the position such that the pump 32 is drawing a vacuum in the vacuum lines 38.

At this point a vacuum is drawn in the transport tank 14a, 14b. The vacuum is approximately 22–25 inches Hg. The vacuum is transmitted to the transport tank 14a, 14b via primary pipe 70 and the plurality of apertures 66 defined in the float ball cage 62. The vacuum does not affect the float ball 68 and the float ball 68 remains disposed on the bottom of the float ball cage 62.

As the air in the transport tank 14a, 14b is substantially exhausted by the vacuum generation unit 30, the vacuum acts through the conduit 22 on the food grade product that is stored in the holding tank 18. This vacuum draws the food product from the holding tank 18 through the flexible conduit 22 and into the transport tank 14a, 14b at a very high rate of flow without the agitation caused by a pump impeller. As the food grade product is drawn from the holding tank 18, air is drawn into the holding tank 18 through the open inlet/vent 24.

The holding tank 18 may have a lesser capacity than the tank 14. In this instance, the holding tank 18 will be emptied prior to fully filling the transport tank 14a, 14b. The operator then observes the emptying of the holding tank 18 and shuts off the vacuum generation unit 30. At the same time as deactivation of the vacuum generation unit 30, a signal is sent to the valve actuator 90 closing the butterfly valve 88. Additionally, removal of the vacuum from left side of the check valve 86 that is the result of deactivating the vacuum generation unit 30 causes the check valve 86 to close, sealing the vacuum transfer unit 10.

In the instance in which the food grade product that is transferred to the transport tank 14a, 14b causes he transport tank 14a, 14b to become filled prior to completely transferring the food grade product from the holding tank 18, the stainless steel float ball 68 rises as the food grade product flows into the float ball cage 62 and sealingly engages the float seat 72. In such condition, the vacuum generation unit 30 is incapable of applying a vacuum to the transport tank 14a, 14b. The operator then deactivates the vacuum generation unit 30. The butterfly valve 88 and check valve 86 are then closed as previously indicated.

The second operating condition is in transport of food product. In this condition, the manually operated butterfly valve 80 is maintained in its closed position. The check valve 86 is closed due to the fact that no vacuum is being applied thereto by the vacuum generation unit 30. If the transport tank 14a, 14b is overly full, the float ball 68 will also in contact with the float seat 72, preventing the surge of foam or food grade product into the primary shut off unit 10. In practice, it is rare that the transport tank 14a, 14b will be so full as to cause this condition and the float ball 68 is then floating free of float seat 72.

The third operating condition is emptying the transport tank 14a, 14b. In this operating condition, as depicted in the embodiment of FIGS. 1 and 2, the operator must ascend to the top of the tank 14a, 14b and manually open the butterfly valve 80 by actuation of the handle 81 to vent the transport tank 14a, 14b. This same action is accomplished in the rear compartment 19 in the embodiment of FIGS. 3–7. The check valve 86 and butterfly valve 88 are maintained in their closed positions. A conduit similar to conduit 22 is connected to the product inlet/outlet 16a, 16b and pumps in the plant that is receiving the food product are activated to empty the transport tank 14a, 14b. The plant may also be equipped with a vacuum transfer apparatus in accordance with the present invention. In such case, a vacuum generation unit similar to vacuum generation unit 30 and a vacuum transfer unit 10 are operably coupled to a receiving tank within the processing plant and removal of the food grade product from the transport tank 14a, 14b is accomplished in a manner similar to the manner described above for transferring the food grade product from the holding tank 18 to the transport tank 14a, 14b.

With respect to the embodiment of FIGS. 3–7, the tanks 14a, 14b may be emptied by utilizing the vacuum generation unit 30. In this case, the four way change over valve 106 must be in the position such that the pump 32 is pressurizing the vacuum lines 38. The preferred vacuum generation unit 30 is capable of imposing a pressure of approximately ten lb/sq in on the product in the tank 14a, 14b. This pressure is conveyed by means of vacuum lines 38 through the vacuum transfer unit 10. The pressure forces the product out of the product inlet/outlet 16a, 16b. Alternatively, in the instance where the plant to which the product is being transferred has a pressurization capability, the plant pressurization unit may be connected to the vent line 122 to pressurize the product in the tank 14. This is accomplished by removing the filter 84 and connecting a conduit from the plant pressurization unit to the butterfly valve 80. The butterfly valve 80 is then opened. The butterfly valve 88 must also be opened by activating the actuator 90 by means of the switch 116a, 1116b. In this configuration, the one way check valve 86 prevents the pressure from pressurizing the vacuum lines 38.

As previously indicated, the cleanliness and sterility of the tanks 14 and associated plumbing is a paramount need. Further, there is a need to perform the necessary cleaning in as timely a manner as possible. Typically, a facility that receives the transported food grade product has one or more cleaning bays. At the end of each work day after the tanks 14 have been unloaded for the last time, the tank vehicle 12 is positioned in the cleaning bay for cleaning of the tank 14.

The cleaning is done in a manner prescribed by governmental bodies, primarily the U.S. Department of Agriculture. A typical cleaning and sanitizing cycle may extend for as much as 25 minutes. The cleaning program typically proceeds through a rinse cycle, a wash cycle, a rinse cycle, a wash cycle, a rinse cycle, and a sanitizing cycle. The cleaning bay has a cleaning unit that includes a hose hook-up for the tank 14. The cleaning unit operates at a certain pressure and volume and cycles through the cleaning program, changing the liquid provided to the tank 14 depending on the particular cycle that the cleaning program is presently operating in.

In addition to cleaning and sanitizing of the tanks 14, the vacuum transfer unit 10 of the present invention includes vacuum lines that must also be cleaned and sanitized since the vacuum lines and the vacuum transfer unit 10 are exposed to the food grade product during transfer operations. In order to efficiently clean and sanitize both the tanks 14, the vacuum transfer units 10, and the vacuum lines associated with the vacuum transfer unit 10, it is desirable to clean the entire system, tanks 14, vacuum transfer units 10, and vacuum lines, during a single cleaning and sanitizing operation. The cleaning system 200 of the present invention provides this single operation cleansing both the tanks 14 and the associated vacuum lines.

The cleaning system 200 is shown generally in FIGS. 8–11. The cleaning system 200 is an improved version of the previously described cleaning apparatus. Like numerals indicate like components in the cleaning system 200 and in the previously described cleaning apparatus. Referring to FIGS. 8 and 9, the detail depicted in FIG. 9 with reference to the rear tank 14b is substantially duplicated with reference to the forward tank 14a. The vacuum line 122 and the cleaning line 130 both extend to the rear of the tank 14b and are plumbed into the rear compartment 19.

A control panel 206 disposed in the rear compartment 19 controls the operation of cleaning system 200. The control panel 206 has two switches 202a and 202b mounted thereon. In a preferred embodiment, the switches 202a, 202b are three-position switches, being selectable between a load position, an off position, and a clean position, as depicted in FIG. 10a. The switches 202a, 202b are communicatively coupled to a timer 212. The timer 212 is communicatively coupled to the two valves 88 (for tanks 14a and 14b) by means of communication lines 114a and 114b. Additionally, the switches 202a, 202b are respectively coupled to the valves 136 (for tanks 14a and 14b) by means of communication lines 204a and 204b. The timer 212 is additionally communicatively coupled to a clean valve 214 by means of a cleaning communication line 208 and to a vacuum valve 216 by means of a vacuum communication line 210.

Figure 10:
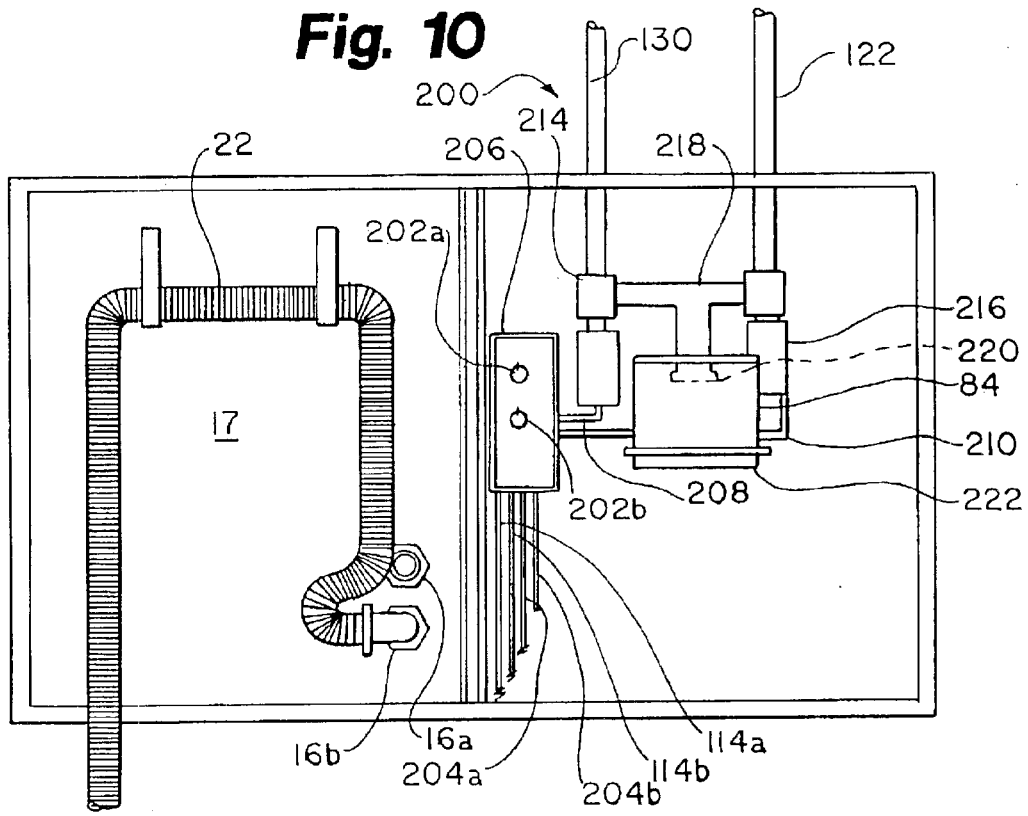
FIG. 10 is an elevational view of the interior of the rear compartment of the tank vehicle.
Figure 10A:
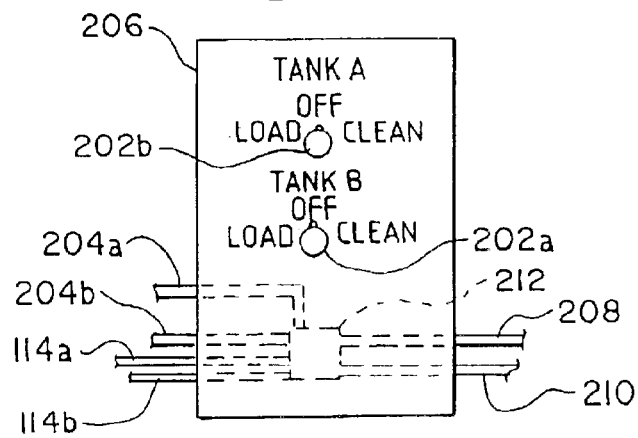
FIG. 10a is an enlarged elevational view of the control panel depicted in FIG. 10.

Referring to FIG. 10, the cleaning line 130 is fluidly coupled to the clean valve 214. The vacuum line 122 is fluidly coupled to the vacuum valve 216. A T-connector 218 fluidly couples the clean valve 214 and the vacuum valve 216. A filter 222 is disposed on a fitting 220 of the T-connector 218. It should be noted that during cleaning operations, the filter 222 is removed to expose the fitting 220 for connection to the line from the cleaning system in the cleaning bay.

Figure 11:
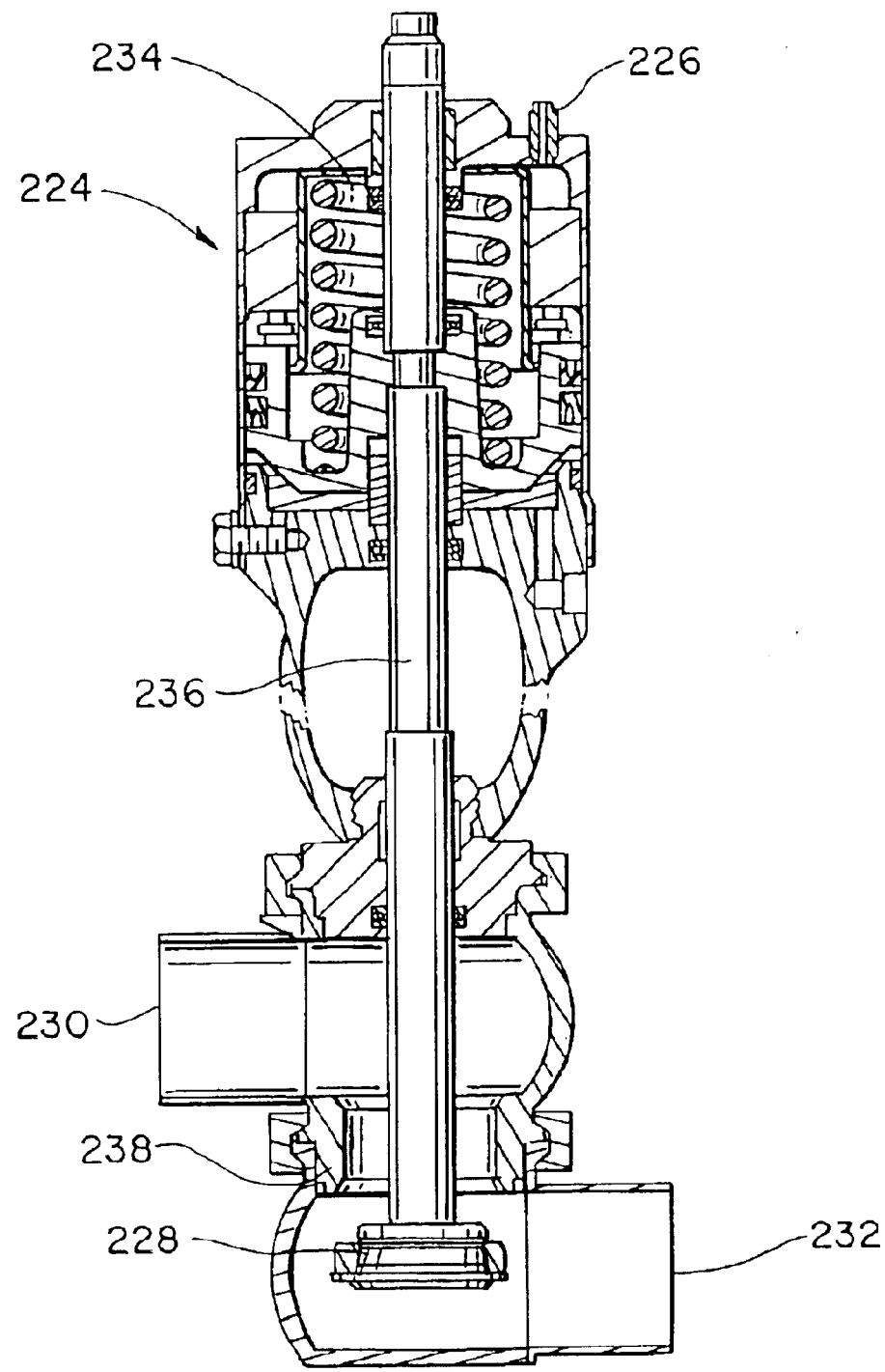
FIG. 11 is a sectional view of a plunger-type valve as used in the present invention.

In a preferred embodiment, the valves 88, 134, 214, and 216 are all plunger type valves as depicted at 224 in FIG. 11. Preferably, the plunger valve 224 is operated pneumatically through a pneumatic inlet 226. Air pressure applied through the pneumatic inlet 226 acts to unseat the plunger 228 to move the plunger 228 to its open disposition as depicted in FIG. 11. In the open disposition of the plunger 228, the fluid inlet 230 is fluidly coupled to the fluid outlet 232.

When pneumatic pressure is removed from the pneumatic inlet 226, the return spring 234 acts on the plunger shaft 236 to return the plunger 228 to a sealed engagement with the seat 236. This action fluidly uncouples the fluid inlet 230 from the fluid outlet 232.

An advantage of the plunger valve 224 as depicted in FIG. 11 is that during cleaning operations, the wetted portions of the plunger valve 224 have been determined to be adequately cleaned and sanitized without removal of any component of the plunger valve 224. Plunger valves of this type are available from Waukesha Cherry-Burrel, Corp., Delevan, Wis.

In a cleaning operation, the filter 220 is removed from the fitting 220. A suitable hose is connected to the fitting 220 from the cleaning system in the cleaning bay. Additionally, drain hoses are coupled to the product inlet/outlet 202a, 202b of the tanks 14a and 14b, respectively. Further, a drain hose is connected to the drain 110 of the secondary shutoff 102. The switches 202a and 202b are rotated to the clean position. This activates the timer 212.

The timer 212 synchronizes the opening and closing of the valves 88, 134, 214, and 216. In a preferred embodiment, the timer 212 alters the configuration of the aforementioned four valves every ten seconds during a cleaning operation. The duration of time between the configuration changes may be altered to match the duration of the various cycles of the cleaning operation as determined by the cleaning system of the cleaning bay. A cleaning system that has relatively high fluid flow rates and fluid pressure typically spends less time in a cycle than a cleaning system that has relatively low fluid flow rates and fluid pressure. The timer 212 may be programmed to vary the configuration switching time to accommodate the cleaning program of the specific cleaning system. During a rinse, wash, or sanitize cycle of the cleaning operation, the configuration of the aforementioned four valves is changed at least once and preferably two or more times during each cycle. The configuration changes of the four valves may vary between once each five seconds and once each five minutes.

In a first configuration, valves 216 and 88 are opened and valves 214 and 134 are closed. In this configuration, cleaning fluid entering fitting 220 is directed through vacuum line 122 to clean the vacuum transfer unit 10. The cleaning fluid is additionally forced through line 38 to the secondary shutoff 102. The fluid cleans the secondary shutoff 102 and then is expelled through drain 110.

In the second configuration, valves 214 and 134 are opened and valves 216 and 88 are closed. In this configuration, cleaning fluid is forced through cleaning line 130 to the spray ball 138 in order to purge the tank 14a, 14b, respectively. Cleaning fluid entering the tanks 14a, 14b is then discharged from the product inlet/outlet 202a, 202b. In this manner, the tanks 14a, 14b and associated vacuum transfer units 10, as well as vacuum lines 122, are all cleaned during a single cleaning operation. It should be noted that the sequencing the valves 88, 134, 214, and 216 between the open and closed configurations occurs substantially simultaneously under control of the timer 212.

Figure 12:
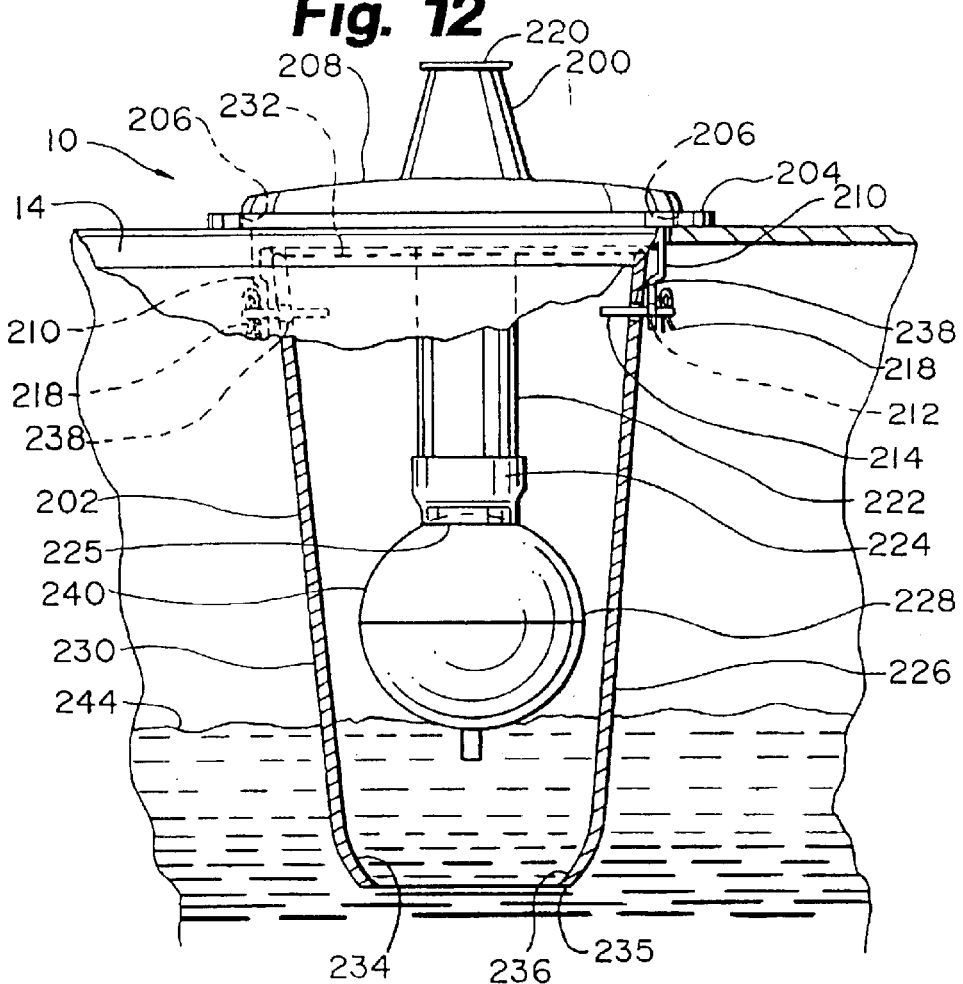
FIG. 12 is a sectional side view of another embodiment of the vacuum transfer unit of the present invention.
Figure 12A:
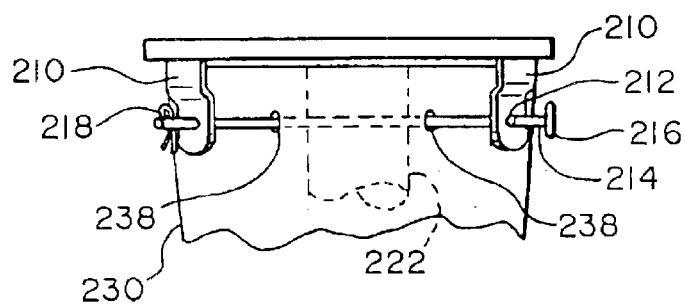
FIG. 12a is a detail sectional side view of the embodiment depicted in FIG. 12.
Figure 13:
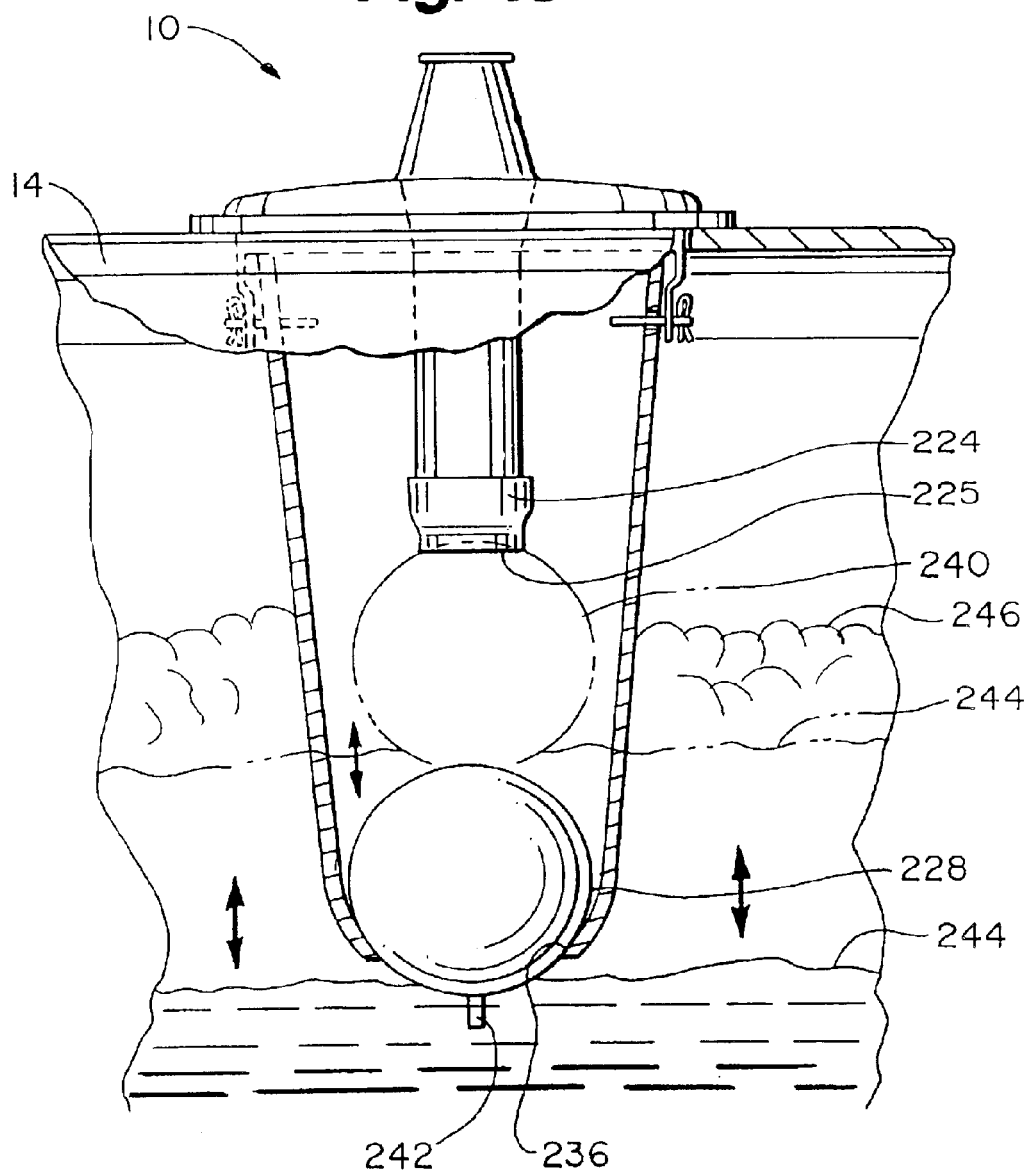
FIG. 13 is a sectional side view of the embodiment of the vacuum transfer unit of FIG. 12 depicting operational movements in phantom.

A further preferred embodiment of the vacuum transfer unit 10 is depicted in FIGS. 12, 12a, and 13. The vacuum transfer unit 10 includes a primary assembly 200 and a ball cage assembly 202.

The primary assembly 200 includes a rim 204 that is sealingly engaged with an aperture defined in the tank 14. The rim has a central aperture 206 defined therein. A domed lid 208 is suspended by engagement with the rim 204 in the central aperture 206.

The domed lid 208 preferably has two pairs of depending retainers 210.

Referring to FIG. 12a, a pair of depending retainers 210 is depicted fixedly coupled to and depending from the domed lid 208. Each of the depending retainers 210 bends inward to be more closely disposed to the ball cage assembly 202. The depending retainers 210 have a retainer aperture 212 defined therein. A retaining rod 214 is passed through the retainer apertures of each of the depending retainers 210 defining a pair of depending retainers 210. The retaining rod 214 may have a head 216 at one end and a removable clip 218 at the other end.

Referring again to FIG. 12, the domed lid 208 has an upward directed fluid coupling. The fluid coupling 220 may be releasably coupled to vacuum and cleaning plumbing as depicted in FIGS. 1, 4, and 5, a fluid pipe 222 depends from the fluid coupling 220. A circumferential seal 224 is imposed over the distal end of the fluid pipe 222. A fluid opening 224 is defined in the distal end of the fluid pipe 222 and seal 224 combination.

The ball cage assembly includes two components: cage 226 and ball 228. The cage 226 has a conical continuous depending wall 230. There are no apertures defined in the wall 230 between the upper margin 232 and the ball opening 236 with the exception of the relatively small slits 238 as will be described below. The upper margin 232 of the conical wall 230 is spaced apart from the domed lid 208 such that fluid may readily pass over the upper margin 232 of the conical wall 230.

The conical wall 230 has an inward taper 234 defined proximate the lower margin 235 of the conical wall 230. The lower margin 235 defines a generally circular ball opening 236. It should be noted that the diameter of the ball opening 236 is substantially less than the diameter of the ball 228 in order to retain the ball 228 within the cage 226.

Two pair of relatively small slits 238 are defined through the conical wall 230. The conical wall 230 is removably suspended from the domed lid 208. This is accomplished by passing the retaining rod 214 through a first slit 238 through the inside of the conical wall 230 and out the second slit 238 to engage the depending retainer 210.

The ball 228 may be conveniently be made in two halves, the upper spherical portion 240 being formed in a very close tolerance hemispherical shape to ensure a sealing engagement with the seal 224. The lower portion of the ball 228 need not be made with such close tolerances. A weight 242 fixedly adhered to the lower portion of the ball 228 ensures that the spherical portion 240 of the ball 228 is always upwardly disposed.

FIG. 13 depicts the vacuum transfer unit 10 of the present invention in two operational modes. The first operational mode is during cleaning of the vacuum transfer unit 10 and the tank 14. In this mode, cleaning solution and rinse are alternately pumped into the fluid coupling 220 and down through the fluid pipe 222 exiting the fluid opening 225. The ball 228 drops downward within the cage 226 and is engaged in a generally sealing engagement with the ball opening 236. In such engagement, cleaning solution or rinse flowing into the cage 226 is prevented from flowing out the ball opening 236 and builds up within the cage 226 to cleanse/rinse both the cage 226 and the underside surfaces of the domed lid 208. The cleaning solution or rinse flows over the upper margin 232 of the conical wall 230 and into the tank 14 after thoroughly cleansing the wetted surfaces of the vacuum transfer unit 10.

The second operation depicted in FIG. 13 is during suction filling of the tank 14. During such operations, a vacuum is imposed on the fluid coupling 220. The vacuum on the tank 14 is drawn primarily via the space defined between the upper margin 232 of the conical wall 230 and the underside of the domed lid 208, since the ball 228 is sealed against the ball opening 236. An advantage of such design is that the weight 242 holds the ball 228 into a stable engagement with the ball opening 236, thereby preventing chattering of the ball 228 against the conical wall 230 during the application of suction to the fluid coupling 220.

As the product 244 rises in the tank 214, the ball 228 is floated upward toward the seal 224. When the product 244 rises to the level indicated in phantom in FIG. 13 (the level depicted also in FIG. 12), the spherical portion 240 of the ball 228 comes into sealing engagement with the seal 224, sealing off the fluid opening 225. An advantage of the end embodiment of FIGS. 12–13 is that by having a continuous conical wall 230 is that any foam 246 that is on top of the product 240 is kept outside of the cage 226 and is not drawn upward by the vacuum through the fluid pipe 222 prior to the sealing engagement of the ball 228 with the seal 224. It is highly advantageous in operation, to prevent any of the product 244 including foam 246 from passing through the vacuum plumbing where it may enter the pump drawing the vacuum.

What is claimed is:

1. A system for handling a liquid food grade product comprising:

a vessel;

a vacuum transfer system adapted to draw the liquid food grade product into said vessel; and a cleaning system for cleaning and sanitizing said vessel and said vacuum transfer system, said cleaning system comprising:

an inlet port adapted to be placed in fluid communication with a source of a cleaning fluid;

at least one spray nozzle disposed in said vessel; and means for selectively placing said at least one spray nozzle and said vacuum transfer system in fluid communication with said inlet port, whereby cleaning fluid supplied from said source of cleaning fluid supplied to said inlet port may be selectively passed through the vacuum transfer system and sprayed into the vessel through said at least one spray nozzle, thereby cleaning, sanitizing and disinfecting said vacuum transfer system and said vessel in a single operation.

2. The system of claim 1, wherein said means for selectively placing said inlet port in fluid communication with said spray nozzle and said vacuum transfer system comprises at least one valve.

3. The system of claim 1, wherein said means for selectively placing said inlet port in fluid communication with said spray nozzle and said vacuum transfer system comprises a plurality of power actuated valves.

4. The system of claim 3, wherein each of said plurality of power actuated valves is a pneumatic valve.

5. The system of claim 3, wherein each of said plurality of valves is a plunger type valve.

6. The system of claim 3, further comprising a control unit in communication with said plurality of valves, said control unit being capable of cyclically operating said plurality of valves so as to cause the cleaning fluid to alternately flow through said vacuum transfer system and said spray nozzle according to a predetermined schedule.

7. The system of claim 6, wherein said control unit is capable of being programmed to operate said each of said plurality of valves in a range from once every five seconds to once every five minutes.

8. The system of claim 7, wherein said control unit is programmed to operate each of said plurality of valves once every ten seconds.

9. The system of claim 1, wherein said vacuum transfer system has a vent, and wherein said inlet port and said vacuum transfer system are in fluid communication through said vent.

10. The system of claim 1, wherein said vacuum transfer system includes a vacuum transfer unit, a plurality of vacuum lines, and a secondary shutoff.

11. A cleaning system for cleaning, sanitizing and disinfecting a vessel and vacuum transfer system, the vessel and vacuum transfer system for handling a liquid food grade product, the cleaning system comprising:

an inlet port adapted to be connected with a source of a cleaning fluid, said inlet port being in fluid communication with the vacuum transfer system; and at least one spray nozzle disposed in the vessel, said at least one spray nozzle being in fluid communication with said inlet port, whereby cleaning fluid from said source of cleaning fluid supplied to said inlet port passes through the vacuum transfer system and is sprayed into the vessel through said at least one spray nozzle, thereby cleaning, sanitizing and disinfecting said vacuum transfer system and said vessel in a single operation.

12. The cleaning system of claim 11, further comprising valving means operably coupled between said inlet port, the vacuum transfer system, and the spray nozzle, said valving means for selectively causing cleaning fluid supplied to said inlet port to flow either through the vacuum transfer system or through the spray nozzle.

13. The cleaning system of claim 12, wherein said valving means comprises a plurality of power actuated valves.

14. The cleaning system of claim 13, wherein each of said plurality of power actuated valves is a pneumatic valve.

15. The cleaning system of claim 14, further comprising a control unit, said control unit in communication with each of said plurality of valves, said control unit being capable of cyclically operating said plurality of valves so as to cause the cleaning fluid to flow through said vacuum transfer unit and said spray nozzle according to a predetermined schedule.

16. The system of claim 15, wherein said control unit is capable of being programmed to operate said each of said plurality of valves in a range from once every five seconds to once every five minutes.

17. The system of claim 16, wherein said control unit is programmed to operate each of said plurality of valves once every ten seconds.

18. The system of claim 11, wherein said vacuum transfer system has a vent, and wherein said inlet port and said vacuum transfer system are in fluid communication through said vent.

19. The system of claim 11, wherein said vacuum transfer system includes a vacuum transfer unit, a plurality of vacuum lines, and a secondary shutoff.

20. A system for handling a liquid food grade product comprising:

vessel;

a selectively activatable vacuum source;

a vacuum transfer unit in fluid communication with said vessel and said vacuum source;

valving means operably coupled to the vacuum source and the vacuum transfer unit for selectively (a) positively pressurizing said vessel to expel the liquid food grade product from said vessel and (b) drawing a vacuum in said vessel to draw the liquid food grade product into said vessel; and means for cleaning and sanitizing said vessel, said vacuum transfer unit, and said valving means.

21. The system of claim 20, wherein the means for cleaning and sanitizing said vessel, said vacuum transfer unit, and said valving means comprises a cleaning system, said cleaning system comprising an inlet port adapted to be connected to a source of a cleaning fluid, means for selectively placing said inlet port in fluid communication with said vessel, and means for selectively placing said inlet port in fluid communication with said vacuum transfer system.

22. The system of claim 20, wherein said means for selectively placing said inlet port in fluid communication with said vessel and said vacuum transfer system comprises a plurality of power actuated valves.

23. The system of claim 22, wherein each of said plurality of power actuated valves is a pneumatic valve.

24. The system of claim 22, further comprising a control unit in communication with said plurality of valves, said control unit being capable of operating said plurality of valves so as to cause the cleaning fluid to flow through said vacuum transfer unit and said vessel according to a predetermined schedule.

25. The system of claim 21, further comprising at least one spray nozzle disposed in said vessel for spraying the cleaning fluid.

26. The system of claim 21, wherein the vacuum transfer system has a vent, and wherein said inlet port is in fluid communication with the vacuum transfer system through said vent.

* * * * *